(12) United States Patent
Kurita (10) Patent No.: US 11,818,178 B2
(45) Date of Patent: Nov. 14, 2023

(54) CONTROL APPARATUS, CONTROL METHOD AND PROGRAM FOR ALLOCATION OF OPERATORS TO SESSION BOARDER CONTROLLERS

(71) Applicant: Nippon Telegraph and Telephone Corporation, Tokyo (JP)

(72) Inventor: Hiroyuki Kurita, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 156 days.

(21) Appl. No.: 17/618,735

(22) PCT Filed: Jun. 25, 2019

(86) PCT No.: PCT/JP2019/025119
§ 371 (c)(1),
(2) Date: Dec. 13, 2021

(87) PCT Pub. No.: WO2020/261372
PCT Pub. Date: Dec. 30, 2020

(65) Prior Publication Data
US 2022/0360611 A1    Nov. 10, 2022

(51) Int. Cl.
*H04M 3/00* (2006.01)
*H04M 5/00* (2006.01)
(Continued)

(52) U.S. Cl.
CPC ...... *H04L 65/1046* (2013.01); *H04L 65/1069* (2013.01)

(58) Field of Classification Search
CPC ............... H04L 65/1043; H04L 63/168; H04L 63/0263; H04L 63/0236; H04L 12/66;
(Continued)

(56) References Cited

U.S. PATENT DOCUMENTS 10,523,733 B1 * 12/2019 Bharrat ............... H04L 65/1069
2004/0158647 A1 * 8/2004 Omura ................... H04L 12/66
709/249

(Continued)

OTHER PUBLICATIONS

[No Author Listed] [online], "Network Functions Virtualisation (NFV); Infrastructure Overview," ETSI GS NFV-INF 001 V1.1.1, dated Jan. 2015, retrieved from URL <https://www.etsi.org/deliver/etsi_gs/NFV-INF/001_099/001/01.01.01_60/gs_NFV-INF001v010101p.pdf>, 59 pages.

*Primary Examiner* — Kharye Pope
(74) *Attorney, Agent, or Firm* — Fish & Richardson P.C.

(57) ABSTRACT

A control device includes a storage unit that stores an upper limit value of the number of calls that can be processed in a predetermined time using a session boarder controller (SBC) and an upper limit value of the number of signal conversion rules that can be processed using the SBC, and an arithmetic operation unit that allocates, to the SBC, an operator the number of calls of which is maximum from among a plurality of operators using the number of calls and the number of signal conversion rules for each operator and determines a combination of operators to be allocated to the SBC from among remaining operators such that an unused resource related to the number of calls and the number of signal conversion rules in the SBC becomes minimum, using the upper limit value of the number of calls and the upper limit value of the number of signal conversion rules read from the storage unit.

6 Claims, 11 Drawing Sheets

(51) Int. Cl.
  *H04L 12/66* (2006.01)
  *H04L 65/1046* (2022.01)
  *H04L 65/1069* (2022.01)

(58) Field of Classification Search
  CPC .............. H04L 65/1101; H04L 5/0053; H04L 63/0218; H04L 61/2564; H04L 69/08; H04L 65/1104; H04L 45/125; H04L 43/16; H04L 65/102; H04W 88/16; H04W 76/10; H04W 92/02; H04W 92/06; H04W 88/14; H04M 7/006; H04M 1/2535; H04M 7/0066; H04M 7/125; H04M 3/42314; H04M 7/127; H04M 2207/12; H04M 2207/18; H04M 15/56; H04M 2215/202; H04M 2207/206; H04M 15/55
  USPC ....... 709/206, 204, 230, 220, 223, 227, 229; 370/395.5
  See application file for complete search history.

(56) References Cited

U.S. PATENT DOCUMENTS

2005/0226250 A1* 10/2005 Makayama ............. H04L 67/56
  370/395.21
2013/0286836 A1* 10/2013 Uzelac .................... H04L 65/00
  370/235
2018/0227165 A1* 8/2018 Philip ................. H04L 43/0817
2018/0367609 A1* 12/2018 Ozkan .................... H04L 67/63

* cited by examiner

| SBC SPECIFICATIONS ||
| NUMBER OF CALLS (call/sec) | NUMBER OF CONVERSION RULES |
| --- | --- |
| 10,000 | 500 |

Fig. 3

| OPERATOR | NUMBER OF CALLS (call/sec) | NUMBER OF CONVERSION RULES |
|---|---|---|
| A | 36,000 | 200 |
| B | 20,000 | 180 |
| C | 12,000 | 250 |
| D | 10,000 | 150 |
| E | 3,500 | 300 |
| F | 3,000 | 90 |
| ... | ... | ... |
| X | 300 | 50 |

| OPERATOR | NUMBER OF CALLS (call/sec) | NUMBER OF CONVERSION RULES |
|---|---|---|
| A(1/4) | 90,000 | 200 |
| A(1/4) | 90,000 | 200 |
| A(1/4) | 90,000 | 200 |
| A(1/4) | 90,000 | 200 |
| B(1/2) | 10,000 | 180 |
| B(1/2) | 10,000 | 180 |
| C(1/2) | 6,000 | 250 |
| C(1/2) | 6,000 | 250 |
| D | 10,000 | 150 |
| E | 3,500 | 300 |
| F | 3,000 | 90 |
| ... | ... | ... |
| X | 3,00 | 50 |

Fig. 6

| OPERATOR | NUMBER OF CALLS (call/sec) | NUMBER OF CONVERSION RULES |
|---|---|---|
| B(1/2) | 10,000 | 180 |
| B(1/2) | 10,000 | 180 |
| D | 10,000 | 150 |
| A(1/4) | 9,000 | 200 |
| A(1/4) | 9,000 | 200 |
| A(1/4) | 9,000 | 200 |
| A(1/4) | 9,000 | 200 |
| C(1/2) | 6,000 | 250 |
| C(1/2) | 6,000 | 250 |
| E | 3,500 | 300 |
| F | 3,000 | 90 |
| ... | ... | ... |
| Q | 900 | 250 |
| ... | ... | ... |
| X | 300 | 50 |

| OPERATOR | NUMBER OF CALLS | NUMBER OF CONVERSION RULES |
|---|---|---|
| A | 36000 | 200 |
| B | 21000 | 200 |
| C | 16000 | 200 |
| D | 14000 | 200 |
| E | 12000 | 200 |
| F | 10000 | 200 |
| G | 9500 | 200 |
| H | 8700 | 200 |
| I | 8200 | 200 |
| J | 7300 | 200 |
| K | 6500 | 200 |
| L | 6100 | 200 |
| M | 5600 | 200 |
| N | 4000 | 200 |
| O | 3200 | 200 |
| P | 2000 | 200 |
| Q | 1700 | 200 |
| R | 1500 | 200 |
| S | 1400 | 200 |
| T | 1300 | 200 |
| U | 1000 | 200 |
| V | 900 | 200 |
| W | 800 | 200 |
| X | 600 | 200 |
| Y | 500 | 200 |
| Z | 200 | 200 |

DIVISION →

| OPERATOR | NUMBER OF CALLS | NUMBER OF CONVERSION RULES |
|---|---|---|
| A(1/4) | 9000 | 200 |
| A(1/4) | 9000 | 200 |
| A(1/4) | 9000 | 200 |
| A(1/4) | 9000 | 200 |
| B(1/3) | 7000 | 200 |
| B(1/3) | 7000 | 200 |
| B(1/3) | 7000 | 200 |
| C(1/2) | 8000 | 200 |
| C(1/2) | 8000 | 200 |
| D(1/2) | 7000 | 200 |
| D(1/2) | 7000 | 200 |
| E(1/2) | 6000 | 200 |
| E(1/2) | 6000 | 200 |
| F | 10000 | 200 |
| G | 9500 | 200 |
| H | 8700 | 200 |
| I | 8200 | 200 |
| J | 7300 | 200 |
| K | 6500 | 200 |
| L | 6100 | 200 |
| M | 5600 | 200 |
| N | 4000 | 200 |
| O | 3200 | 200 |
| P | 2000 | 200 |
| Q | 1700 | 200 |
| R | 1500 | 200 |
| S | 1400 | 200 |
| T | 1300 | 200 |
| U | 1000 | 200 |
| V | 900 | 200 |
| W | 800 | 200 |
| X | 600 | 200 |
| Y | 500 | 200 |
| Z | 200 | 200 |

SORT ① →

Fig. 10A

| OPERATOR | NUMBER OF CALLS | NUMBER OF CONVERSION RULES |
|---|---|---|
| F | 10000 | 200 |
| G | 9500 | 200 |
| A(1/4) | 9000 | 200 |
| A(1/4) | 9000 | 200 |
| A(1/4) | 9000 | 200 |
| A(1/4) | 9000 | 200 |
| H | 8700 | 200 |
| I | 8200 | 200 |
| C(1/2) | 8000 | 200 |
| C(1/2) | 8000 | 200 |
| J | 7300 | 200 |
| B(1/3) | 7000 | 200 |
| B(1/3) | 7000 | 200 |
| B(1/3) | 7000 | 200 |
| D(1/2) | 7000 | 200 |
| D(1/2) | 7000 | 200 |
| K | 6500 | 200 |
| L | 6100 | 200 |
| E(1/2) | 6000 | 200 |
| E(1/2) | 6000 | 200 |
| M | 5600 | 200 |
| N | 4000 | 200 |
| O | 3200 | 200 |
| P | 2000 | 200 |
| Q | 1700 | 200 |
| R | 1500 | 200 |
| S | 1400 | 200 |
| T | 1300 | 200 |
| U | 1000 | 200 |
| V | 900 | 200 |
| W | 800 | 200 |
| X | 600 | 200 |
| Y | 500 | 200 |
| Z | 200 | 200 |

SORT ① → ALLOCATION →

| OPERATOR | ALLOCATED SBC |
|---|---|
| F | SBC_1 |
| G | SBC_2 |
| A(1/4) | SBC_3 |
| A(1/4) | SBC_4 |
| A(1/4) | SBC_5 |
| A(1/4) | SBC_6 |
| H | SBC_7 |
| I | SBC_8 |
| C(1/2) | SBC_9 |
| C(1/2) | SBC_10 |
| J | SBC_11 |
| B(1/3) | SBC_12 |
| B(1/3) | SBC_13 |
| B(1/3) | SBC_14 |
| D(1/2) | SBC_15 |
| D(1/2) | SBC_16 |
| K | SBC_17 |
| L | SBC_18 |
| E(1/2) | SBC_19 |
| E(1/2) | SBC_20 |
| M | SBC_21 |
| N | SBC_19 |
| O | SBC_17 |
| P | SBC_9 |
| Q | SBC_8 |
| R | SBC_10 |
| S | SBC_11 |
| T | SBC_7 |
| U | SBC_3 |
| V | SBC_4 |
| W | SBC_5 |
| X | SBC_6 |
| Y | SBC_2 |
| Z | SBC_12 |

CONTROL APPARATUS, CONTROL METHOD AND PROGRAM FOR ALLOCATION OF OPERATORS TO SESSION BOARDER CONTROLLERS

CROSS-REFERENCE TO RELATED APPLICATIONS

This application is a National Stage application under 35 U.S.C. §371 of International Application No. PCT/JP2019/025119, having an International Filing Date of Jun. 25, 2019. The disclosure of the prior application is considered part of the disclosure of this application, and is incorporated in its entirety into this application.

TECHNICAL FIELD

The present disclosure relates to a control device, a control method, and a control program.

BACKGROUND ART

Session boarder controllers (SBCs) are arranged at borders of a plurality of operator networks and convert signals (for example, SIP signals) sent from other operator networks into signals that can be distributed to its own operator network. Currently, network function virtualization (NFV) that virtualizes network functions, which is used by communication operators to provide services, on a general-purpose server has increasingly been introduced (see Non Patent Literature 1), and there are also virtualized SBCs.

CITATION LIST

Non Patent Literature

Non Patent Literature 1: "Network Functions Virtualisation (NFV); Infrastructure Overview", ETSI, [online], [accessed on Jun. 17, 2019], <URL: https://www.etsi.org/deliver/etsi_gs/NFV-INF/001_099/001/01.01.01_60/gs_NFV-INF001v010101p.pdf>

SUMMARY OF THE INVENTION

Technical Problem

The number of calls distributed in a predetermined time between the operator and its own operator network and the number of signal conversion rules required for conversion into signals that can be distributed to its own operator network and for reverse conversion vary from operator to operator. On the other hand, the number of calls and the number of signal conversion rules that can be processed in a predetermined time using one SBC are limited. An allocating operation that which SBC is to process calls of each operator is thus complicated, the number of calls between each operator and its own operator changes over time, and it is thus necessary to perform the allocating operation again in accordance with the change. Current NFVs can only execute auto-scaling for increasing or reducing the number of virtual servers in accordance with a load on the virtual servers and cannot determine which operators are to be allocated to which SBCs in accordance with the number of calls and the number of signal conversion rules that are information unique to each application.

The present disclosure is made in view of the aforementioned circumstances, and an object thereof is to provide a technique that enables allocation of operators to SBCs.

Means for Solving the Problem

A control device according to an aspect of the present disclosure includes a storage unit configured to store an upper limit value of the number of calls that is allowed to be processed in a predetermined time using a session boarder controller (SBC) and an upper limit value of the number of signal conversion rules that is allowed to be processed using the SBC, and an arithmetic operation unit configured to allocate, to the SBC, an operator the number of calls of which is maximum from among a plurality of operators using the number of calls and the number of signal conversion rules for each of the plurality of operators and determine a combination of operators to be allocated to the SBC from among remaining operators of the plurality of operators such that an unused resource related to the number of calls and the number of signal conversion rules in the SBC becomes minimum, using the upper limit value of the number of calls and the upper limit value of the number of signal conversion rules read from the storage unit.

A control method according to an aspect of the present disclosure is a control method performed by a control device, the method includes, by the control device, storing, in a storage unit, an upper limit value of the number of calls that is allowed to be processed in a predetermined time using a session boarder controller (SBC) and an upper limit value of the number of signal conversion rules that is allowed to be processed using the SBC, and, by the control device, allocating, to the SBC, an operator the number of calls of which is maximum from among a plurality of operators using the number of calls and the number of signal conversion rules for each of the plurality of operators and determining a combination of operators to be allocated to the SBC from among remaining operators of the plurality of operators such that an unused resource related to the number of calls and the number of signal conversion rules in the SBC becomes minimum, using the upper limit value of the number of calls and the upper limit value of the number of signal conversion rules read from the storage unit.

An aspect of the present disclosure is a control program that causes a computer to operate as the aforementioned control device.

Effects of the Invention

According to the present disclosure, it is possible to provide a technique that enables allocation of operators to SBCs.

DESCRIPTION OF EMBODIMENTS

Hereinafter, an embodiment of the present disclosure will be described with reference to the drawings. Note that the same reference signs will be applied to the same components in the drawings and descriptions thereof will be omitted.

Overall Configuration of Control System

Figure 1:
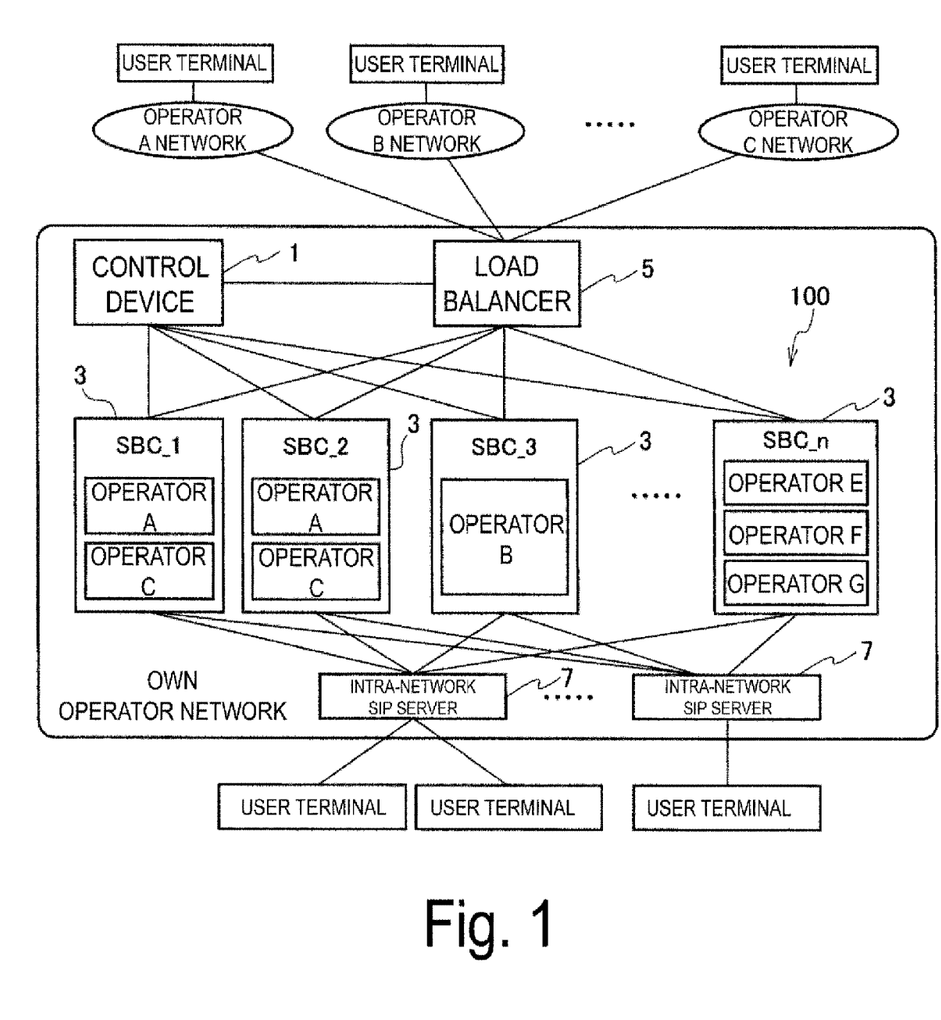
FIG. 1 is a configuration diagram illustrating an entire control system according to an embodiment of the present disclosure.

FIG. 1 is a configuration diagram illustrating an entire control system 100 according to an embodiment of the present disclosure. The control system 100 includes a control device 1, a plurality of session boarder controllers (SBCs) 3, one or more load balancers 5, and a plurality of intra-network SIP servers 7.

Each of the plurality of SBCs 3 is connected to the one or more load balancers 5 and is also connected to the plurality of intra-network SIP servers 7. The plurality of SBCs 3 are arranged at borders between its own operator network and other operator networks, and one or more other operator networks (an operator A, an operator B, . . . ) are allocated to each of the SBCs 3. Each of the plurality of SBCs 3 performs conversion between signals of other operator networks and signals of its own operator network using conversion rules for other operator networks allocated to the SBC 3 itself. In other words, each of the plurality of SBCs 3 converts signals sent from each of other operator networks via the load balancer 5 into signals that can be distributed in its own operator network and also performs reverse conversion thereof. The signals sent from each of other operator networks are, for example, SIP signals and voice signals between the networks. The signals that can be distributed in its own operator network are, for example, SIP signals and voice signals in the network. The SBCs 3 may be dedicated hardware devices or may be virtualization applications (network functions virtualisation (NFV) application) that are pieces of software operating on a general-purpose server.

The load balancer 5 is also arranged at borders between its own operator network and other operator networks similarly to the SBCs 3. The load balancers 5 transfer IP packets based on preset transfer information. In other words, the load balancers 5 hold transfer information that associates transmission source information and transfer destination SBCs and transfer signals sent from specific other operator networks to specific SBCs based on the transfer information. In FIG. 1, the load balancer 5 transfers signals sent from an operator A network or an operator C network to an SBC_1. The load balancer 5 may be a gateway router.

The control device 1 is connected to the plurality of SBCs 3 and is also connected to the one or more load balancers 5. The control device 1 determines which operators are to be allocated to which SBCs 3. Then, the control device 1 sets transfer information based on the determined allocation result to the load balancer 5 and sets signal conversion rules for each operator network to each SBC 3 that is an allocation destination. Hereinafter, the control device 1 will be described.

Configuration of Control Device

Figure 2:
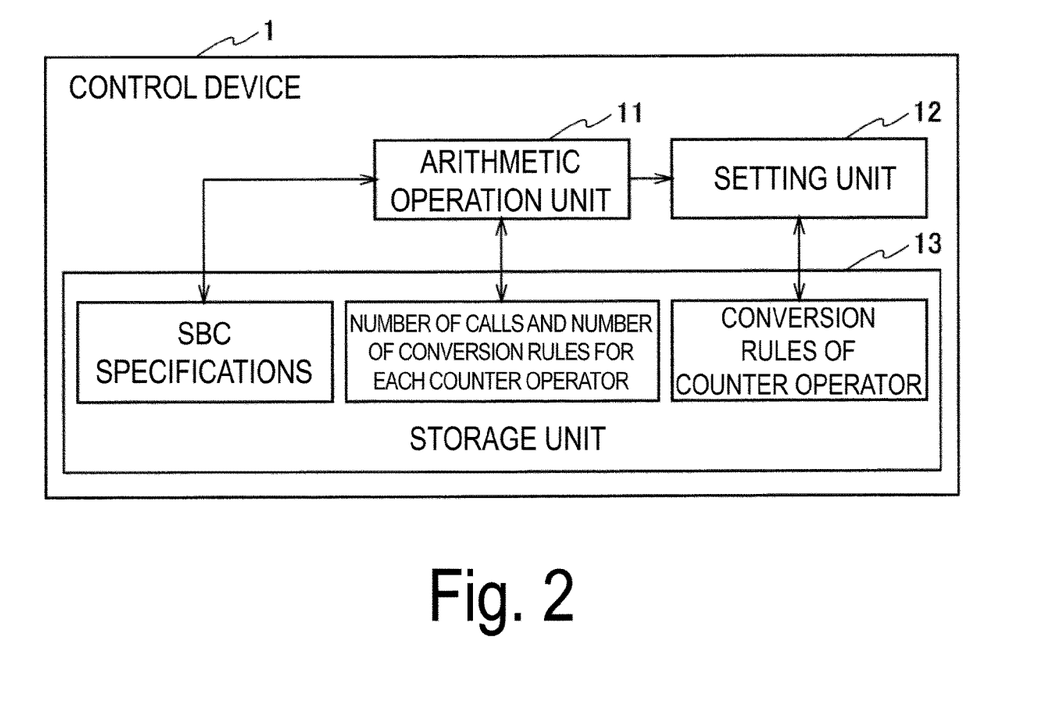
FIG. 2 is a block diagram illustrating a configuration of a control device.

FIG. 2 is a block diagram illustrating a configuration of the control device 1. The control device 1 includes an arithmetic operation unit 11, a setting unit 12, and a storage unit 13.

Figure 3:
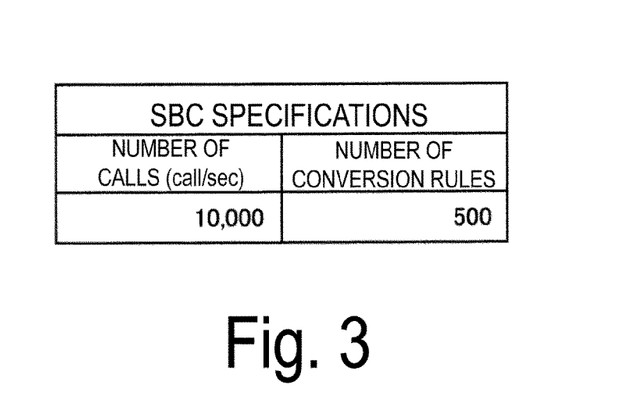
FIG. 3 is a diagram illustrating an example of SBC specifications information.

The storage unit 13 includes a function of storing SBC specifications information. The SBC specifications information is information indicating performance of each SBC3 alone. The SBC specifications information includes an upper limit value of the number of calls that can be processed by a single SBC in a predetermined time and an upper limit value of the number of signal conversion rules that can be processed by a single SBC. FIG. 3 is a diagram illustrating an example of the SBC specifications information.

Figure 4:
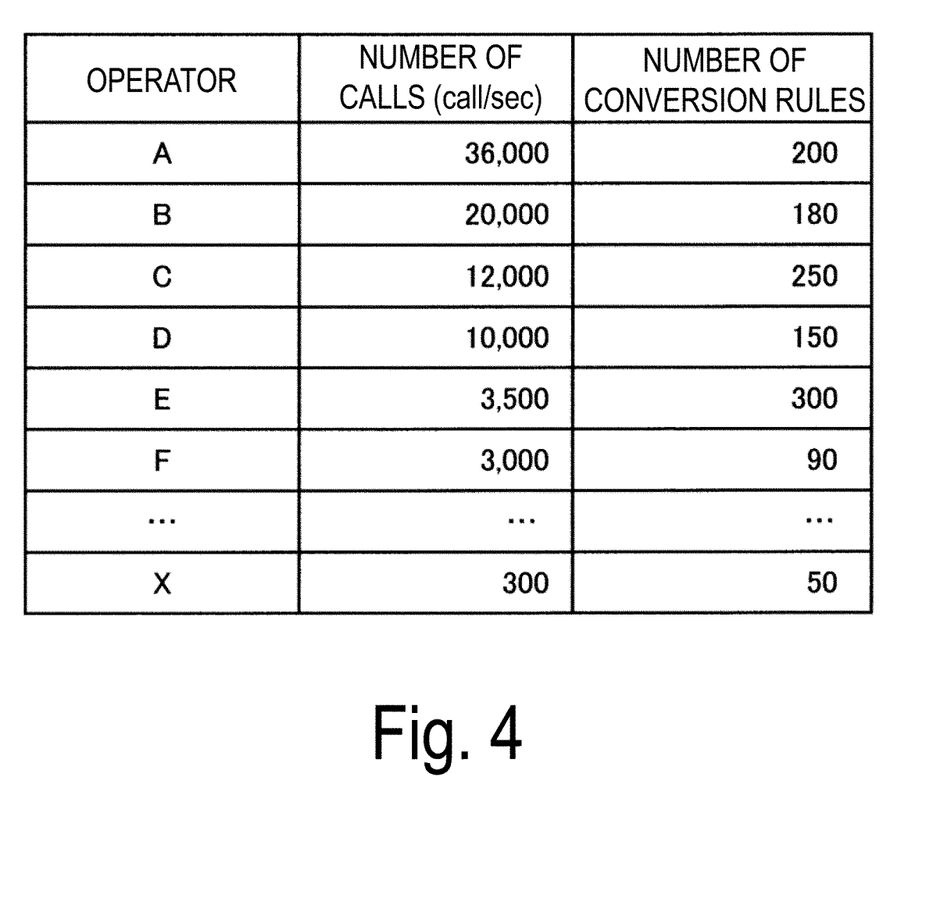
FIG. 4 is a diagram illustrating an example of information regarding the number of calls and the number of conversion rules for each counter operator.

The storage unit 13 includes a function of storing information regarding the number of calls and the number of conversion rules for each counter operator. The information regarding the number of calls and the number of conversion rules for each counter operator includes, for each of other counter operators, the number of calls that is distributed in a predetermined time between other operator networks and its own operator network and the number of signal conversion rules necessary to perform conversion and reverse conversion of signals from other operator networks into signals that can be distributed in its own operator network. FIG. 4 is a diagram illustrating an example of the information regarding the number of calls and the number of conversion rules for each counter operator.

The storage unit 13 includes a function of storing conversion rule information of the counter operators. The conversion rule information of the counter operators includes conversion rules for each of other operators used to perform conversion and reverse conversion of signals from other operator networks into signals that can be distributed in its own operator network.

The arithmetic operation unit 11 includes a function of determining whether the number of calls of other operators exceeds the performance of each SBC 3 alone, using the SBC specifications information and the information regarding the number of calls and the number of conversion rules for each counter operator read from the storage unit 13.

The arithmetic operation unit 11 includes a function of dividing the numbers of calls of other operators to the number that is equal to or less than the performance of each SBC 3 alone in a case in which the numbers of calls of other operators exceeds the performance of each SBC 3 alone and not dividing the numbers of calls of other operators in a case in which the numbers of calls of other operators does not exceed the performance of each SBC 3 alone.

The arithmetic operation unit 11 includes a function of allocating, to the SBC 3, an operator with the largest number of calls from among the plurality of other operators using the SBC specifications information and the information regarding the number of calls and the number of conversion rules for each counter operator read from the storage unit 13 and determining a combination of operators to be allocated to the SBC 3 from among remaining operators such that an unused resource related to the number of calls and the number of signal conversion rules in the SBC 3 becomes minimum.

The arithmetic operation unit 11 includes a function of determining the total number of SBCs 3 required by its own operator network based on the result of allocating the operators to the SBC 3.

The setting unit 12 includes a function of setting transfer information based on the result of allocating the operators to the SBC 3 in the load balancer 5 and setting the conversion rule information of other operators read from the storage unit 13 in the SBC 3 that is allocation destination.

The setting unit 12 includes a function of providing an instruction for increasing or reducing the SBCs 3 in number to an NFV infrastructure server that constructs and manages the SBCs 3 in a case in which the SBCs 3 are virtualization application, and when the determined total number of SBCs 3 includes excess or shortage.

The configuration of the control device 1 illustrated in FIG. 2 is an example. In addition to the above components, the control device 1 may further include a receiving unit or an input unit that receives, from the outside, the SBC specifications information, the information regarding the number of calls and the number of conversion rules for each counter operator, and the conversion rule information of counter operators and stores them in the storage unit 13.

Operation of Control Device

Figure 5:
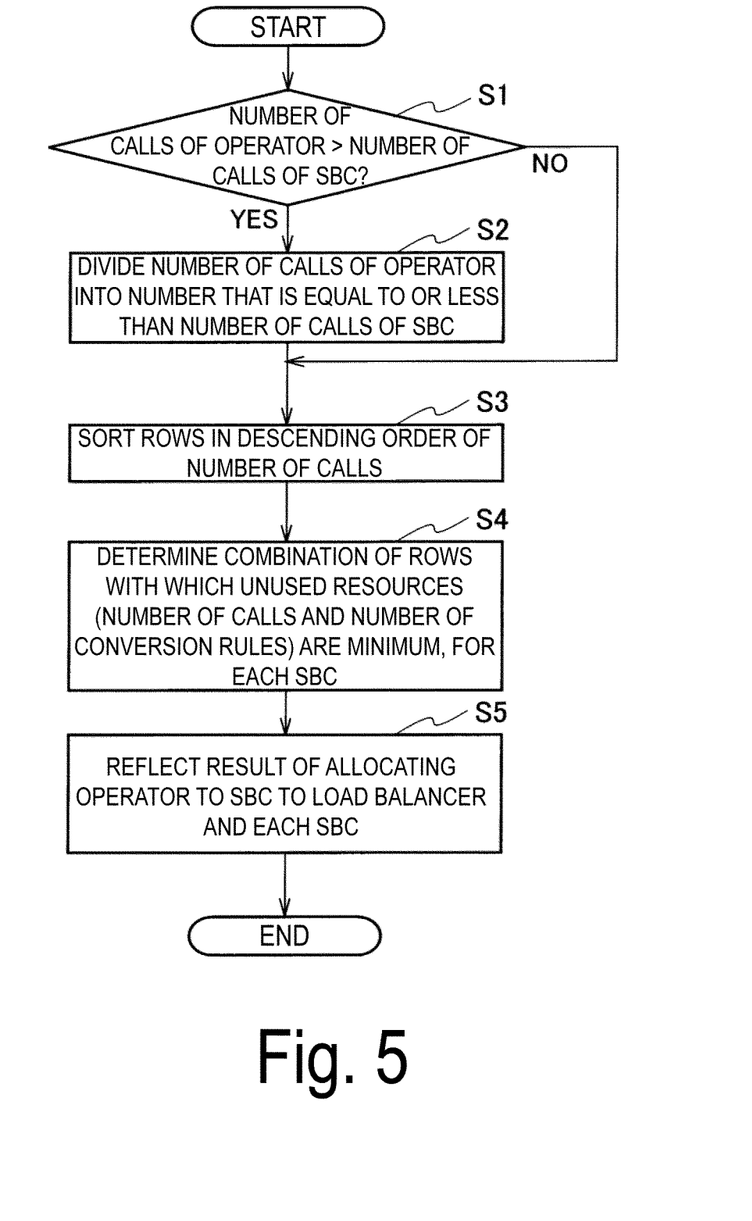
FIG. 5 is a flowchart illustrating an example of operations of the control device.

FIG. 5 is a flowchart illustrating an example of operations of the control device 1. The control device 1 obtains, as input information, the SBC specifications information and the information regarding the number of calls and the number of conversion rules for each counter operator and determines which operators are to be allocated to which SBCs 3 using the input information. In addition, the control device 1 determines the total number of SBCs 3 required in its own operator network. Thereafter, the control device 1 sets the conversion rule information of the counter operators to each SBC 3.

Step S1;

The arithmetic operation unit 11 compares the number of calls of each of other operators included in the information regarding the number of calls and the number of conversion rules for each counter operator (FIG. 4) with the number of calls in the SBC specifications information (FIG. 3) and determines whether the number of calls of each of other operators exceeds the number of calls of the SBC specifications. The arithmetic operation unit 11 proceeds to Step S2 in a case in which the number of calls of each of other operators exceeds the number of calls of the SBC specifications, and the arithmetic operation unit 11 skips Step S2 and proceeds to Step S3 in a case in which the number of calls of each of other operators does not exceed the number of calls of the SBC specifications.

Figure 6:
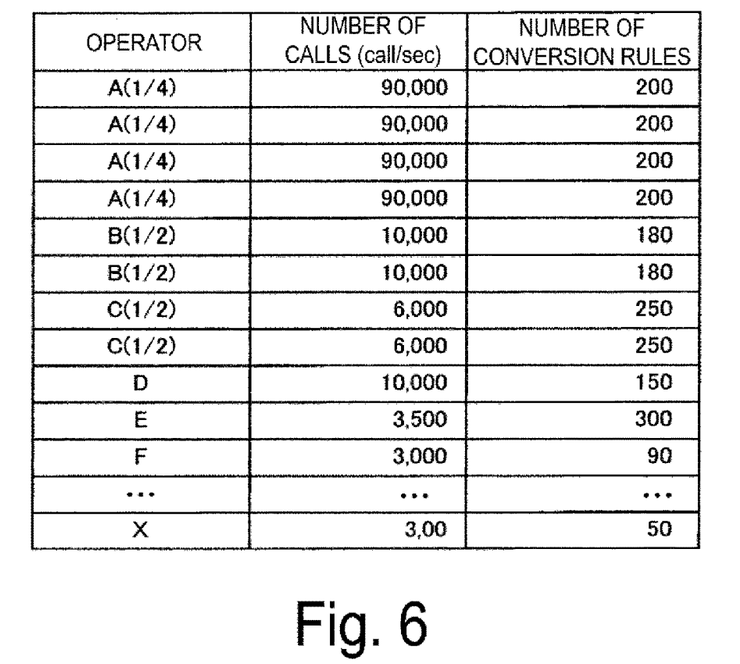
FIG. 6 is a diagram illustrating an example of division of the information regarding the number of calls and the number of conversion rules.

Step S2;

In the case in which the number of calls of each of other operators exceeds the number of calls of the SBC specifications, the arithmetic operation unit 11 divides the number of calls of the corresponding one of other operators to be equal to or less than the number of calls of the SBC specifications. In FIG. 4, the operators A, B, and C correspond to this case, and the arithmetic operation unit 11 thus evenly divides the number of calls of each of the operators A, B, and C. The number of conversion rules is not divided. FIG. 6 is a diagram illustrating an example of the division of the information regarding the number of calls and the number of conversion rules.

Figure 7:
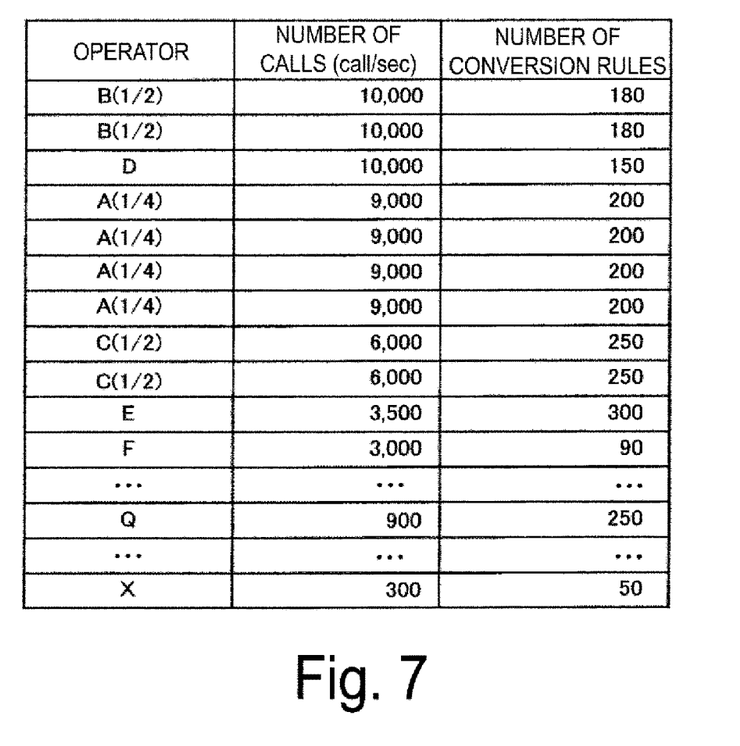
FIG. 7 is a diagram illustrating an example of sorting of the information regarding the number of calls and the number of conversion rules.

Step S3;

Next, the arithmetic operation unit 11 sorts rows of the information regarding the number of calls and the number of conversion rules in a descending order of the numbers of calls. FIG. 7 is a diagram illustrating an example of the sorting of the information regarding the number of calls and the number of conversion rules. The arithmetic operation unit 11 may sort the rows of the information regarding the number of calls and the number of conversion rules in a descending order of products between the number of calls and the number of conversion rules, instead of performing sorting based only on the numbers of calls.

Step S4;

Next, the arithmetic operation unit 11 determines a combination of operators to be allocated to the SBC 3 from among other operators in units of rows of the information regarding the number of calls and the number of conversion rules illustrated in FIG. 7 such that an unused resource related to the number of calls and the number of signal conversion rules in the SBCs 3 becomes minimum. The unused resource is a resource that cannot be effectively used because there are no allocatable operators and are products between the number of calls and the number of conversion rules. Also, the arithmetic operation unit 11 determines the total number of SBCs 3 required in its own operator network based on the result of allocating the operators to the SBC 3.

Figure 8:
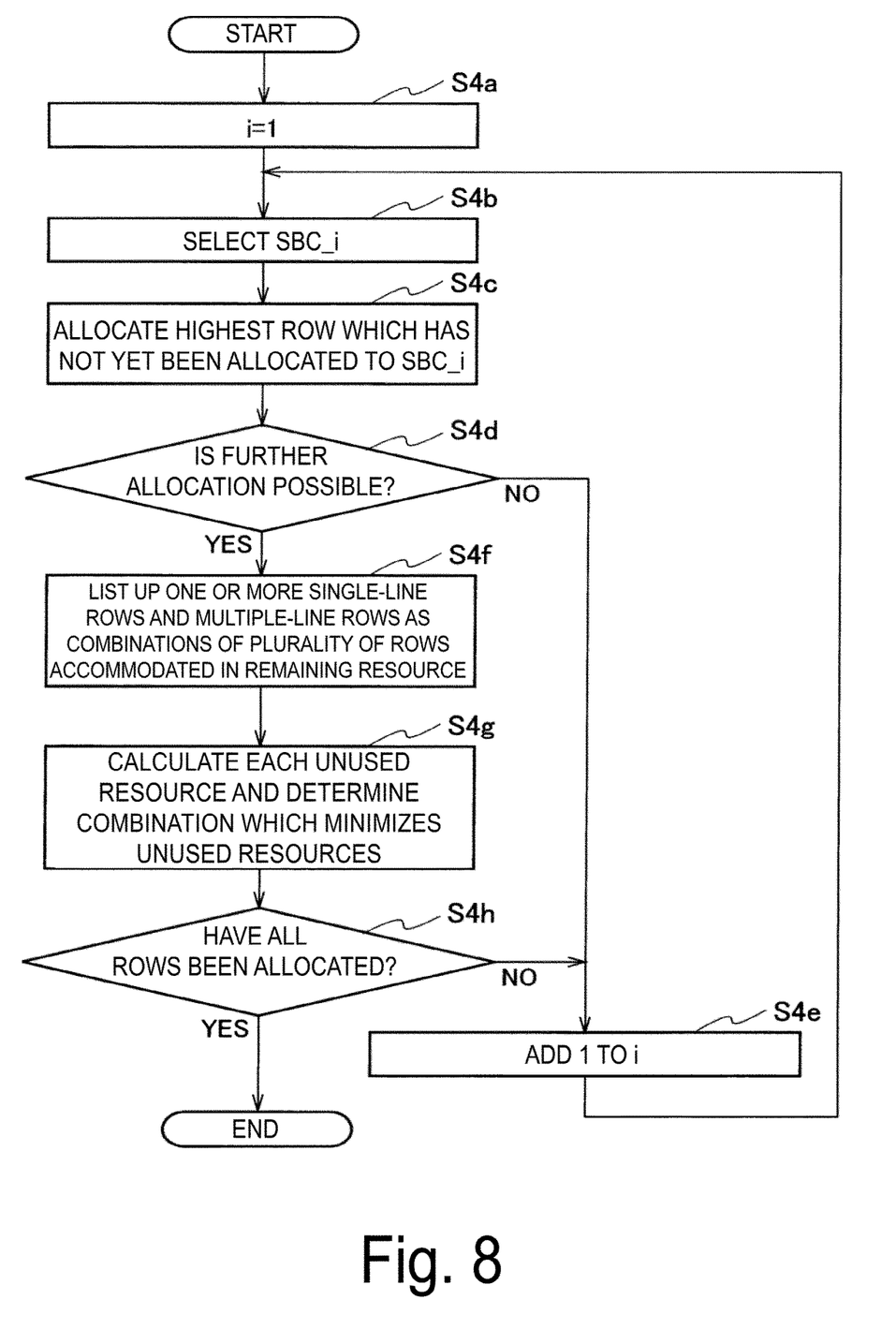
FIG. 8 is a flowchart illustrating an example of operations in Step S4.

FIG. 8 is a flowchart illustrating an example of operations in Step S4.

Step S4*a*;

The arithmetic operation unit 11 defines the plurality of SBCs 3 as SBC_i and i=1.

Step S4*b*;

Next, the arithmetic operation unit 11 selects SBC_i (i=1) from among the plurality of SBCs 3.

Step S4*c*;

Next, the arithmetic operation unit 11 allocates an unallocated highest row from the information regarding the number of calls and the number of conversion rules to the selected SBC_i (i=1).

Step S4*d*;

Next, the arithmetic operation unit 11 calculates the remaining resource of the SBC_i (i=1) that is being selected and determines whether the resources can further be allocated to the SBC_i (i=1) that is being selected. The arithmetic operation unit 11 proceeds to Step S4*f* in a case in which it is possible to allocate further resources to SBC_i (i=1) that is being selected, and the arithmetic operation unit 11 proceeds to Step S4*e* in a case in which it is not possible to allocate further resources to SBC_i (i=1) that is being selected.

Step S4*e*;

In the case in which it is not possible to allocate further resources to SBC_i (i=1) that is being selected, the arithmetic operation unit 11 adds 1 to i, returns to Step S4*b*, and executes the processing in and after Step S4*b* for SBC_i (i=2).

Step S4*f*;

In a case in which it is possible to allocate further resources to SBC_i (i=1) that is being selected, the arithmetic operation unit 11 lists up one or more single-line rows and multiple-line rows as combinations of a plurality of rows that are accommodated in the remaining resource except for the rows that have already been allocated in the information regarding the number of calls and the number of conversion rules.

Step S4*g*;

Next, the arithmetic operation unit 11 applies each of the number of calls and the number of conversion rules related to the one or more single-line rows and multiple-line rows listed up to the remaining resource, calculates each of the unused resources, and determines a single-line row or a multiple-line row that minimizes the unused resource.

Here, a specific example of the processing executed in Step S4c and Steps S4f to S4 g will be described. In the information regarding the number of calls and the number of conversion rules illustrated in FIG. 7, each of the number of calls of the operator B (1/2) in the first row, the number of calls of the operator B (1/2) in the second row, and the number of calls of the operator D in the third row is equal to the upper limit value of the number of calls of the SBC specifications, in order from the highest row. The arithmetic operation unit 11 thus allocates the operator B (1/2), the operator B (1/2), and the operator D to SBC_1, SBC_2, and SBC_3, respectively.

Figure 9:
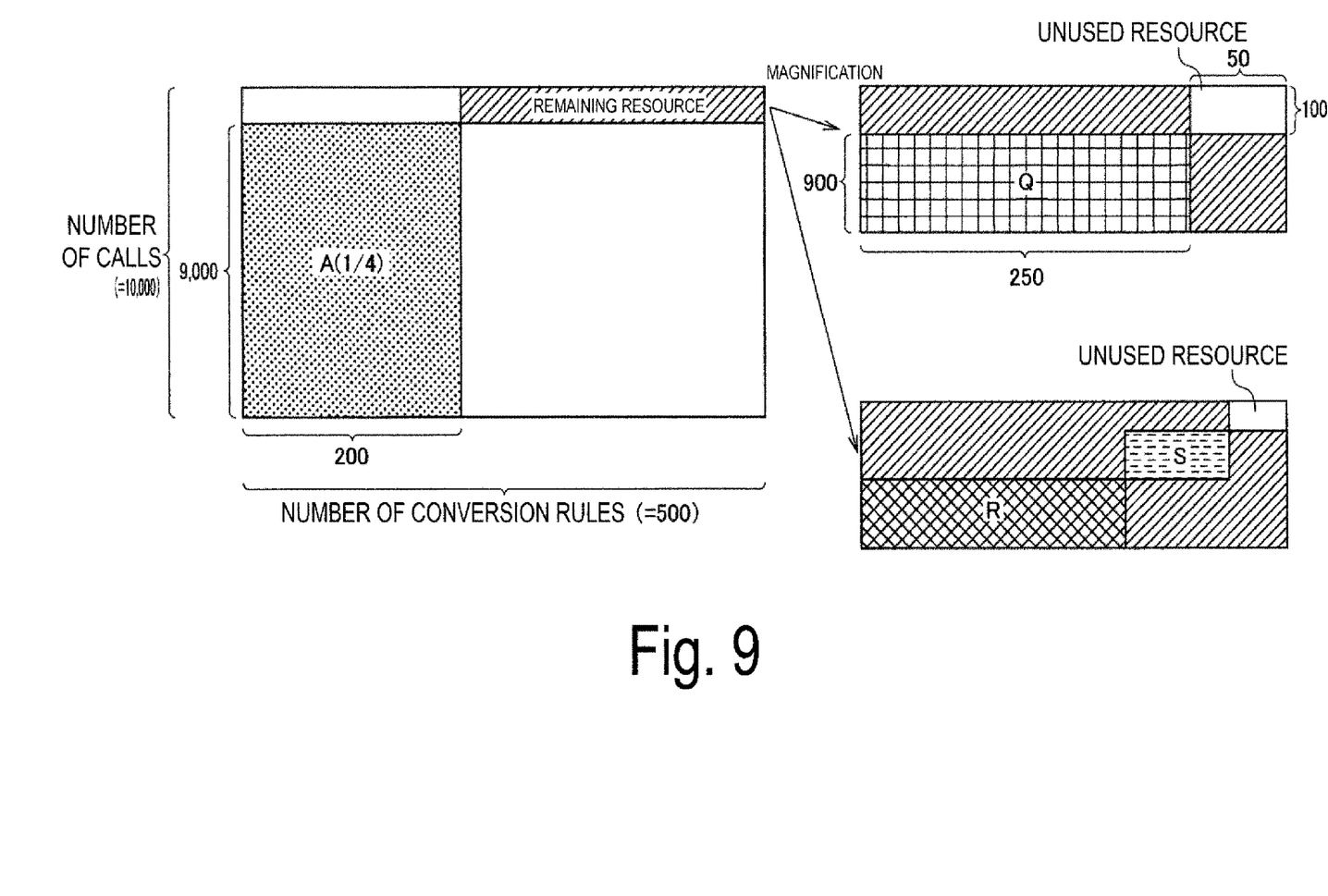
FIG. 9 is a diagram illustrating an image of a method of determining a combination of operators.

Next, the arithmetic operation unit 11 allocates the operator A (1/2) in the following fourth row to SBC_4 first as illustrated in FIG. 9. Next, the arithmetic operation unit 11 lists up the operator Q, the operator S, and the operator R as row candidates that are to be accommodated in the remaining resource (the number of calls=1,000, the number of conversion rules=300) obtained by removing the resource of the operator A (1/2) in the fourth row from all the resources of SBC_4. Thereafter, the arithmetic operation unit 11 applies each of the operator Q, the operator S, and the operator R listed up to the remaining resource of SBC_4 to calculate each of the unused resources of SBC_4. Then, the arithmetic operation unit 11 determines the operator Q and the operator R with less unused resource as further allocated operators.

Step S4h;

Next, the arithmetic operation unit 11 refers to the information regarding the number of calls and the number of conversion rules to determine whether all the rows have been allocated. In a case in which all the rows have been allocated, the arithmetic operation unit 11 ends the processing in Step S4 and proceeds to Step S5 illustrated in FIG. 5. In a case in which all the rows have not been allocated, the arithmetic operation unit 11 proceeds to Step S4e, adds 1 to i, returns to Step S4b, and repeatedly executes Steps S4b to S4 h until allocation of all the rows is determined.

Figure 10A:
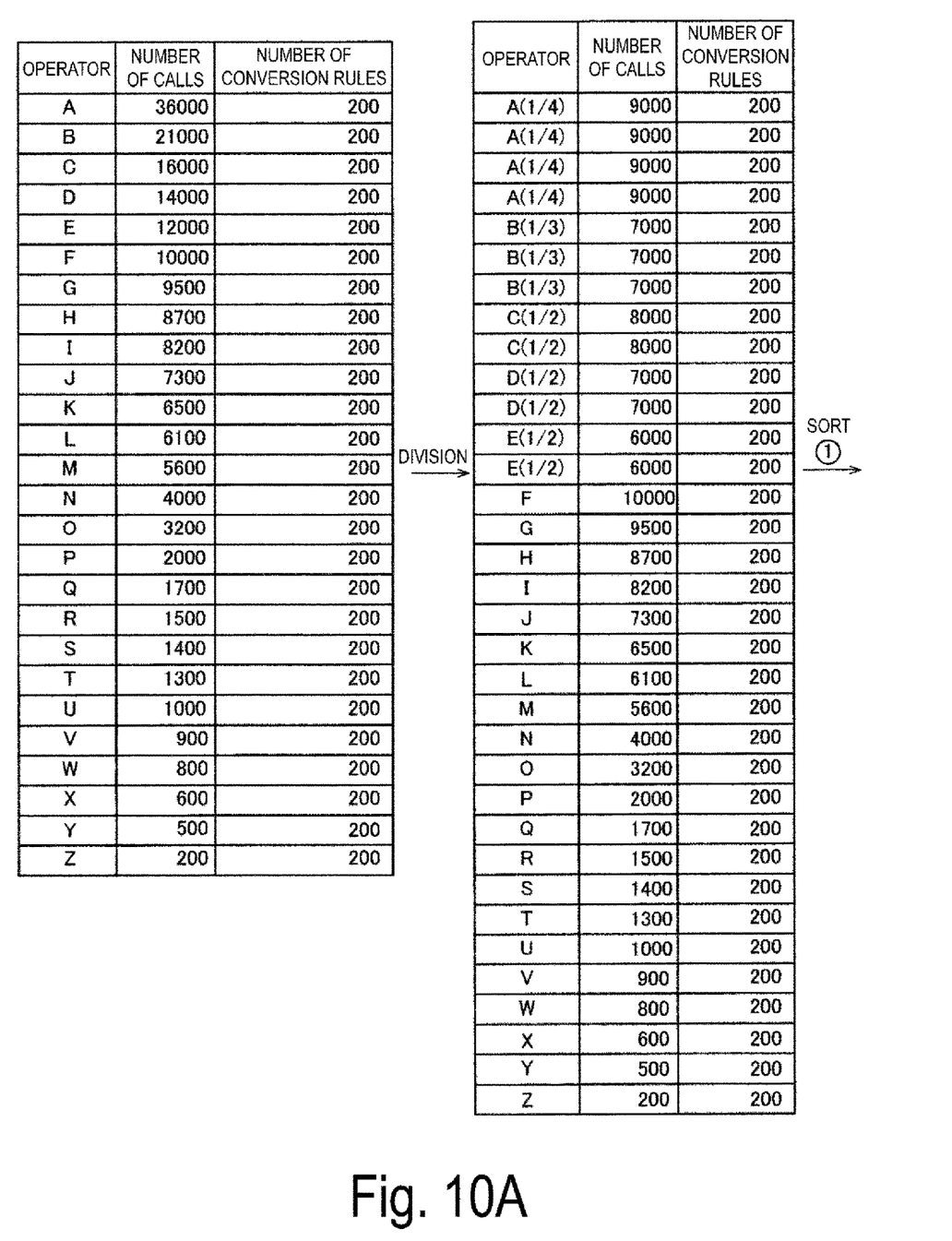
FIG. 10A is a diagram illustrating an example of division of the information regarding the number of calls and the number of conversion rules.
Figure 10B:
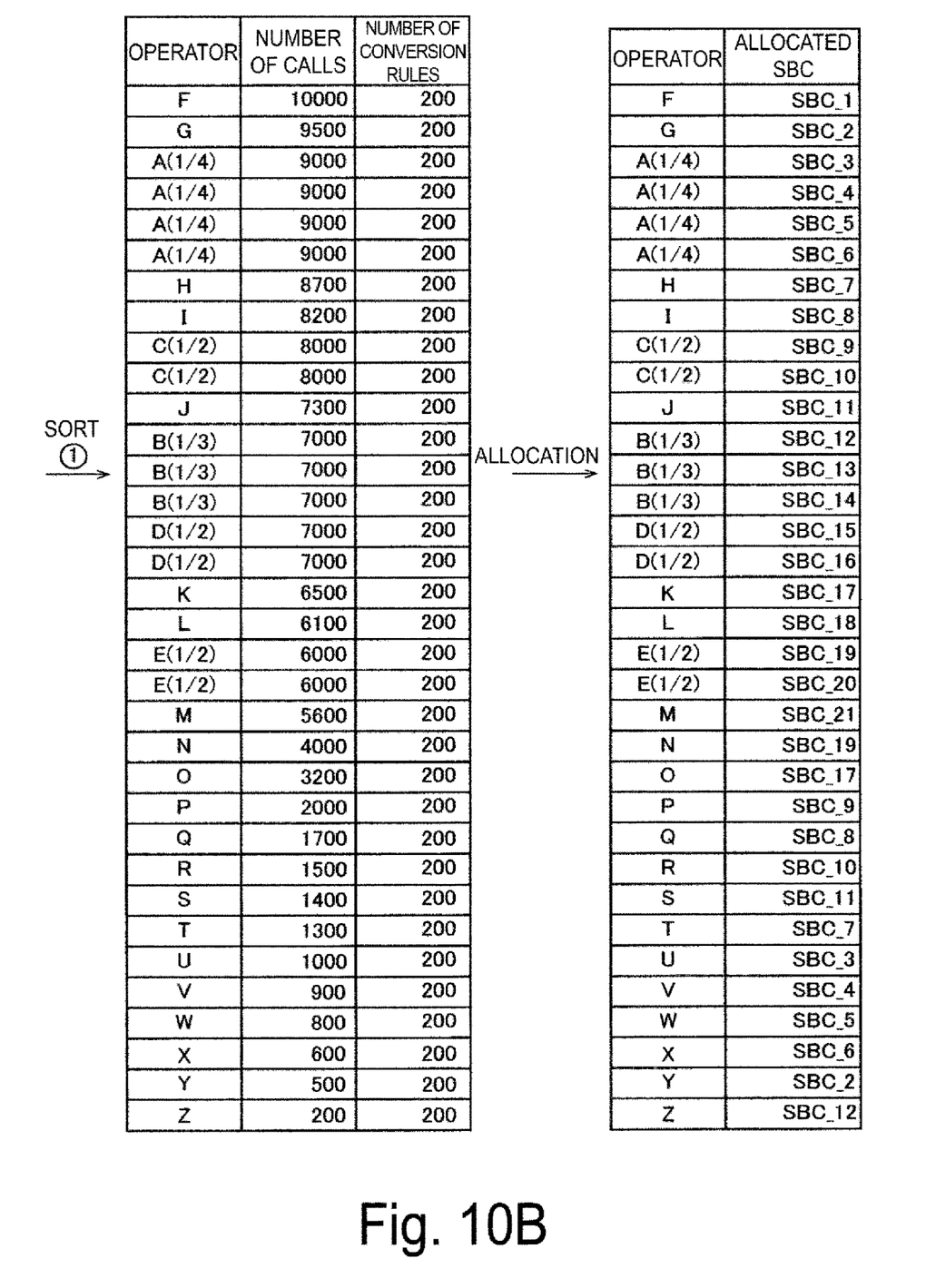
FIG. 10B is a diagram illustrating an example of sorting of the information regarding the number of calls and the number of conversion rules and an example of a result of allocating operators to SBCs.

An example of division and sorting of the information regarding the number of calls and the number of conversion rules generated based on the processing performed until now and an example of the result of allocating each of other operators to the plurality of SBCs 3 are illustrated in FIGS. 10A and 10B. The operators A to Z are allocated to SBC_1 to SBC_21 alone or in an overlapping manner. In FIG. 10B, the total number of SBCs 3 required in its own operator network is determined to be 21.

Step S5;

Finally, the setting unit 12 sets, in the load balancer 5, transfer information indicating that which SBCs 3 a signal sent from each of other operators is to be transferred, based on the allocation result determined in Step S4. In addition, the setting unit 12 sets conversion rules for converting signals from allocated other operators into intra-network signals for each SBC 3.

Figure 11:
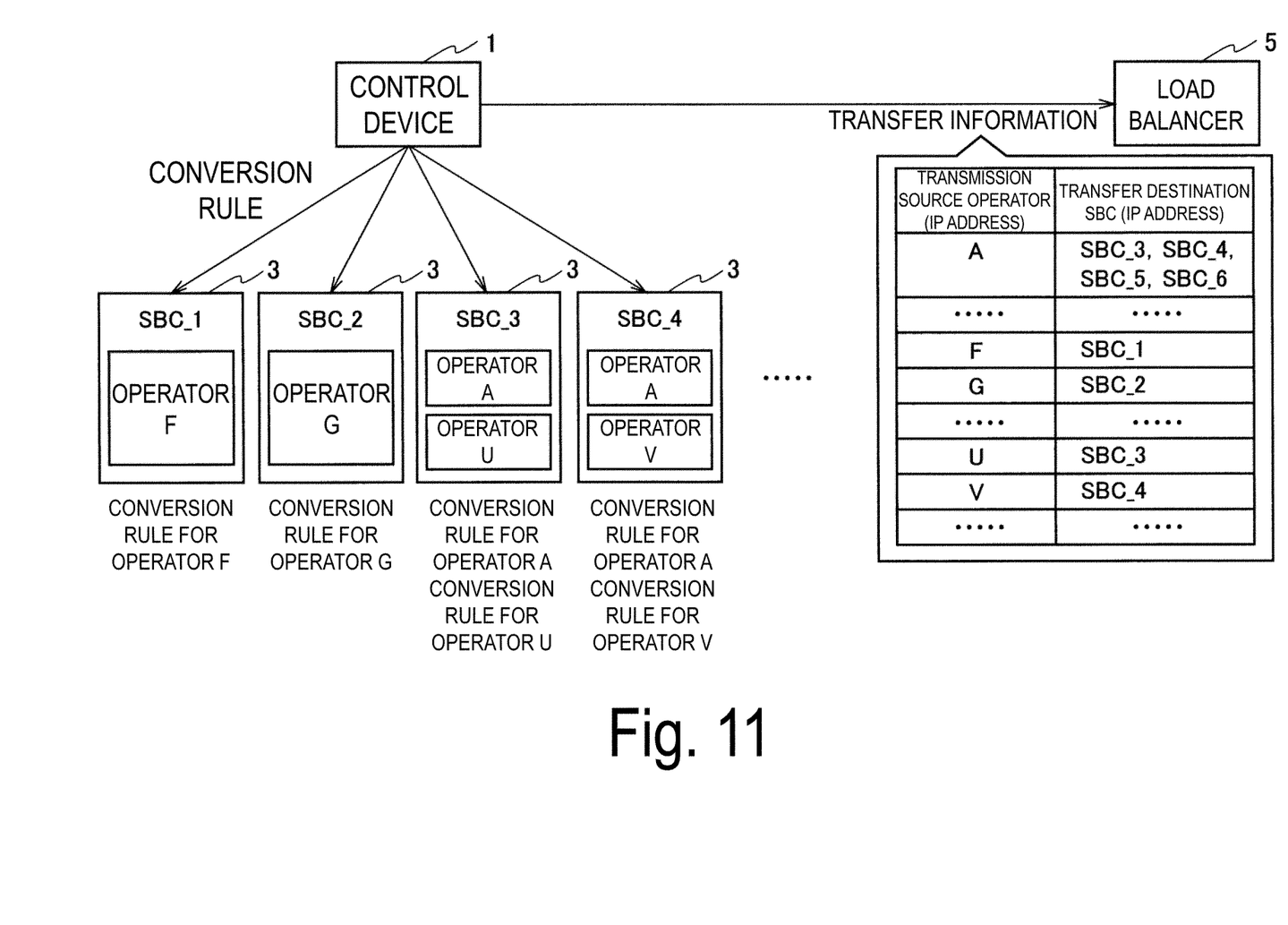
FIG. 11 is a diagram illustrating an example of a setting method based on a result of allocating a combination of operators.

In a case in which the operator A is allocated to SBC_3, SBC_4, SBC_5, and SBC_6 as illustrated in FIG. 11, for example, the setting unit 12 sets, to the load balancer 5, transfer information regarding a signal from the operator A to be transferred to any of SBC_3, SBC_4, SBC_5, and SBC_6 and sets the conversion rules for the operator A in each of SBC_3, SBC_4, SBC_5, and SBC_6.

Also, in a case in which the SBCs 3 are virtualization applications, the setting unit 12 provides an instruction for increasing or reducing the SBCs 3 in number to the NFV infrastructure server that constructs and manages the SBCs 3 if there is excess or shortage of the total number of SBCs 3 determined in Step S4 as compared with the current total number of SBCs 3.

Modification Examples

Allocating of calls of each of other operators to at least two SBCs in consideration of redundancy is also conceivable. In this case, the arithmetic operation unit 11 may always divide the number of calls of each of other operators into two or more even in a case in which the number of calls of each of other operators does not exceed the number of calls of the SBC specifications in the control device 1. For example, the arithmetic operation unit 11 determines whether the number of calls of each of other operators has been divided into two or more after Step S1 or S2 and divides the numbers of calls of other operators, which has not been divided into two or more, into two or more. The arithmetic operation unit 11 executes the same processing as the aforementioned processing in and after Step S3.

Advantages

According to the present embodiment, it is possible to provide a technology that enables allocation of operators to SBCs 3 because the control device 1 includes a storage unit 13 configured to store SBC specifications information including an upper limit value of the number of calls that is allowed to be processed in a predetermined time using a single SBC and an upper limit value of the number of signal conversion rules that is allowed to be processed using the single SBC, and an arithmetic operation unit 11 configured to allocate, to the SBC 3, an operator the number of calls of which is maximum from among a plurality of operators using the number of calls and the number of signal conversion rules for each of the plurality of operators and determine a combination of operators to be allocated to the SBC from among remaining operators such that an unused resource related to the number of calls and the number of signal conversion rules in the SBC 3 becomes minimum, using the upper limit value of the number of calls and the upper limit value of the number of signal conversion rules read from the storage unit 13.

Note that the present disclosure is not limited to the aforementioned embodiment and various modifications can be made within the scope of the gist of the present disclosure.

Figure 12:
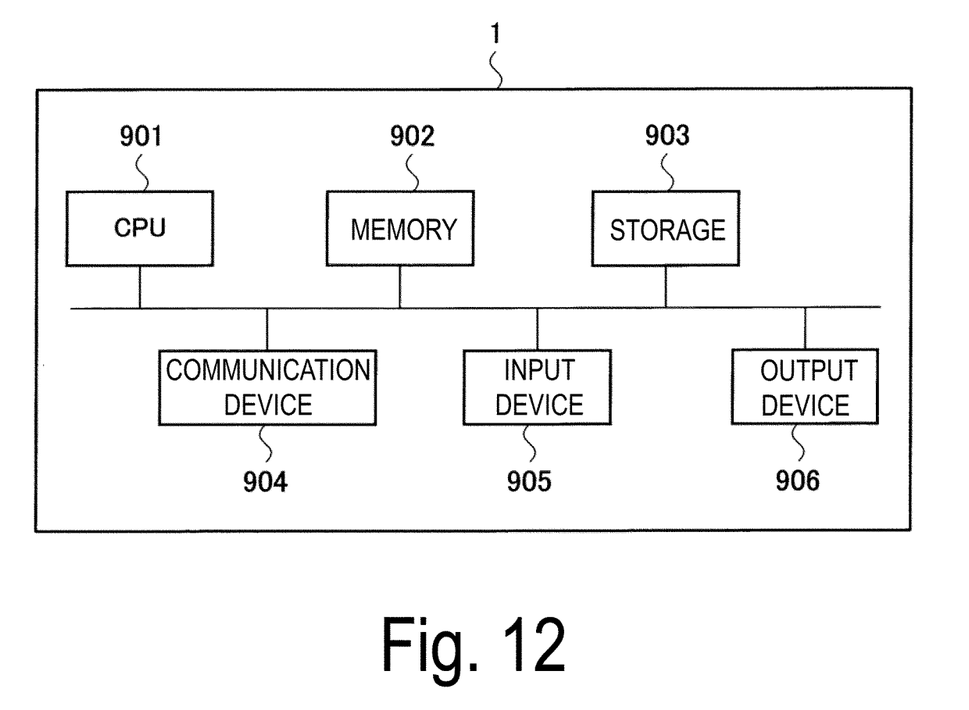
FIG. 12 is a configuration diagram of a general-purpose computer.

As the control device 1 according to the aforementioned present embodiment, as illustrated in FIG. 12, it is possible to use a general-purpose computer system including a central processing unit (CPU; a processor) 901, a memory 902, a storage (a hard disk drive or a solid state drive) 903, a communication device 904, an input device 905, and an output device 906. The memory 902 and the storage 903 are storage devices. In the computer system, each function of the control device 1 is implemented by the CPU 901 executing a predetermined program loaded on the memory 902.

The control device 1 may be implemented by a single computer or may be implemented by a plurality of computers. Also, the control device 1 may be a virtual machine implemented on a computer.

The program for the control device 1 may be stored in a computer-readable recording medium such as a hard disk drive (HDD), a solid state drive (SSD), a universal serial bus (USB) memory, a compact disc (CD), or a digital versatile disc (DVD) or may be distributed via a network.

REFERENCE SIGNS LIST

1 Control device
11 Arithmetic operation unit
12 Setting unit
13 Storage unit
3 SBC
5 Load balancer
7 Intra-network SIP server
100 Control system
901 CPU
902 Memory
903 Storage
904 Communication device
905 Input device
906 Output device

The invention claimed is:

1. A control device comprising:
a storage medium configured to store an upper limit value of a number of calls that is allowed to be processed in a predetermined time using a session boarder controller (SBC) and an upper limit value of a number of signal conversion rules that is allowed to be processed using the SBC; and
an arithmetic operation unit, including one or more processors, configured to allocate, to the SBC, an operator the number of calls of which is maximum from among a plurality of operators using the number of calls and the number of signal conversion rules for each of the plurality of operators and determine a combination of operators to be allocated to the SBC from among remaining operators of the plurality of operators such that an unused resource related to the number of calls and the number of signal conversion rules in the SBC becomes minimum, using the upper limit value of the number of calls and the upper limit value of the number of signal conversion rules read from the storage medium.

2. The control device according to claim 1, wherein the arithmetic operation unit is configured to divide, when the number of calls of the operator the number of calls of which is maximum exceeds the upper limit value of the number of calls, the number of calls of the operator the number of calls of which is maximum such that the number of calls of the operator the number of calls of which is maximum becomes equal to or less than the upper limit value of the number of calls.

3. A control method performed by a control device, the method comprising:
by the control device, storing, in a storage medium, an upper limit value of a number of calls that is allowed to be processed in a predetermined time using a session boarder controller (SBC) and an upper limit value of a number of signal conversion rules that is allowed to be processed using the SBC; and
by the control device, allocating, to the SBC, an operator the number of calls of which is maximum from among a plurality of operators using the number of calls and the number of signal conversion rules for each of the plurality of operators and determining a combination of operators to be allocated to the SBC from among remaining operators of the plurality of operators such that an unused resource related to the number of calls and the number of signal conversion rules in the SBC becomes minimum, using the upper limit value of the number of calls and the upper limit value of the number of signal conversion rules read from the storage medium.

4. A non-transitory computer readable medium storing one or more instructions that causes a computer to operate as a control device to execute: storing, in a storage medium, an upper limit value of a number of calls that is allowed to be processed in a predetermined time using a session boarder controller (SBC) and an upper limit value of a number of signal conversion rules that is allowed to be processed using the SBC; and
allocating, to the SBC, an operator the number of calls of which is maximum from among a plurality of operators using the number of calls and the number of signal conversion rules for each of the plurality of operators and determining a combination of operators to be allocated to the SBC from among remaining operators of the plurality of operators such that an unused resource related to the number of calls and the number of signal conversion rules in the SBC becomes minimum, using the upper limit value of the number of calls and the upper limit value of the number of signal conversion rules read from the storage medium.

5. The control method according to claim 3, further comprising:
dividing, when the number of calls of the operator the number of calls of which is maximum exceeds the upper limit value of the number of calls, the number of calls of the operator the number of calls of which is maximum such that the number of calls of the operator the number of calls of which is maximum becomes equal to or less than the upper limit value of the number of calls.

6. The non-transitory computer readable medium according to claim 4, wherein the one or more instructions further cause the computer to execute:
dividing, when the number of calls of the operator the number of calls of which is maximum exceeds the upper limit value of the number of calls, the number of calls of the operator the number of calls of which is maximum such that the number of calls of the operator the number of calls of which is maximum becomes equal to or less than the upper limit value of the number of calls.

* * * * *